(12) United States Patent
Tung

(10) Patent No.: US 6,448,902 B1
(45) Date of Patent: *Sep. 10, 2002

(54) LIGHT-EMITTING DEVICE FOR COVERING REMOVABLY CONIE ROADBLOCK

(76) Inventor: Rong-Fang Tung, No. 9, Ln 39, Houshing N. RD., Gangshan Jen (TW)

( * ) Notice: Subject to any disclaimer, the term of this patent is extended or adjusted under 35 U.S.C. 154(b) by 0 days.

This patent is subject to a terminal disclaimer.

(21) Appl. No.: 09/687,994

(22) Filed: Oct. 12, 2000

(30) Foreign Application Priority Data

Mar. 6, 2000 (TW) .................................. 8911007669 A
Apr. 21, 2000 (TW) .................................. 8911005468 A

(51) Int. Cl.⁷ .............................................. G08B 5/22
(52) U.S. Cl. .................. 340/815.45; 340/908; 340/471; 340/472; 340/473; 362/241; 362/310; 362/237; 362/397
(58) Field of Search ........................... 340/815.45, 908, 340/908.1, 473, 471, 472

(56) References Cited

U.S. PATENT DOCUMENTS

| | | | | |
|---|---|---|---|---|
| 4,541,190 A | * | 9/1985 | Weiner et al. ................. | 40/610 |
| 5,195,453 A | * | 3/1993 | McGibbon, II ................ | 116/63 |
| 5,294,924 A | * | 3/1994 | Dydzyk .................... | 340/908.1 |
| 5,488,792 A | * | 2/1996 | Kwok ......................... | 40/612 |
| 5,577,824 A | * | 11/1996 | Wright .................... | 340/908.1 |
| 5,585,783 A | * | 12/1996 | Hall .......................... | 340/473 |
| 5,606,309 A | * | 2/1997 | Smith ........................ | 340/473 |
| 6,027,227 A | * | 2/2000 | Tung ......................... | 362/241 |

* cited by examiner

Primary Examiner—Jeffery Hofsass
Assistant Examiner—Hung Nguyen
(74) Attorney, Agent, or Firm—Raymond Y. Chan; David and Raymond Patent Group

(57) ABSTRACT

A light-emitting device is designed to cover removably a conic roadblock and is formed of a hollow conic body and a plurality of warning units. The hollow conic body is formed of an outer fabric layer and an inner fabric layer. The warning units are disposed on the outer fabric layer of the conic body. The conic body is fitted over the conic roadblock. The warning units are provided with a light-emitting diode to make the conic roadblock vividly visible to the operator of an approaching motor vehicle.

20 Claims, 9 Drawing Sheets

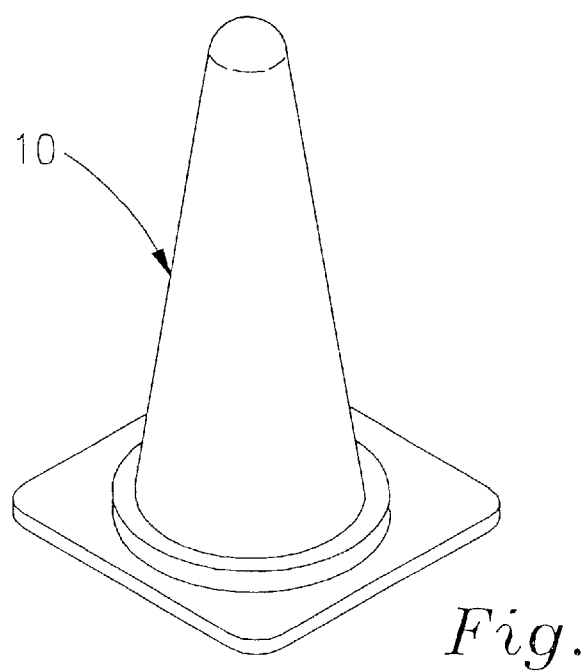
Fig.1
Prior Art
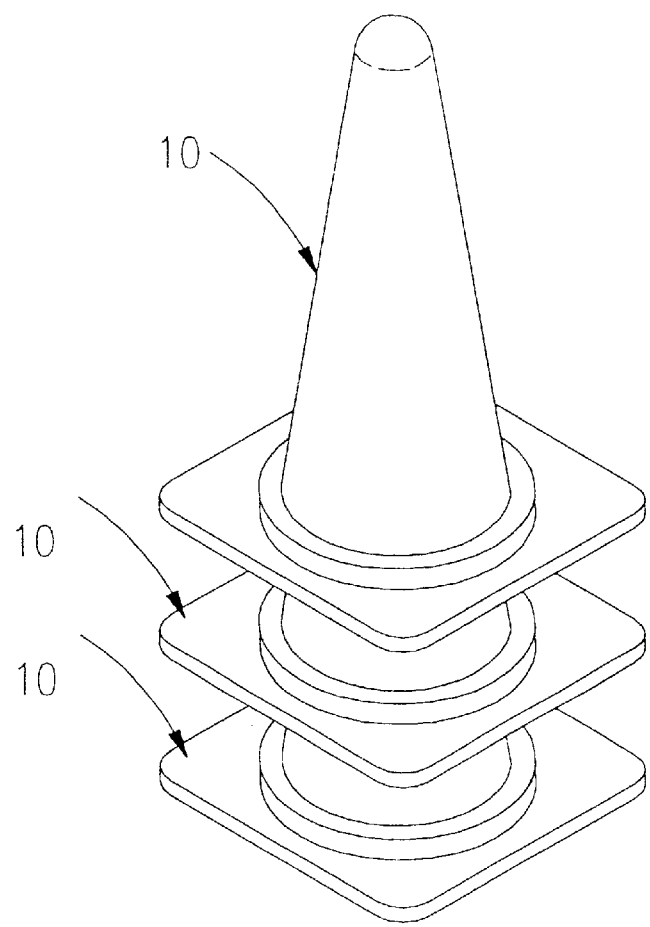
Fig.1-A

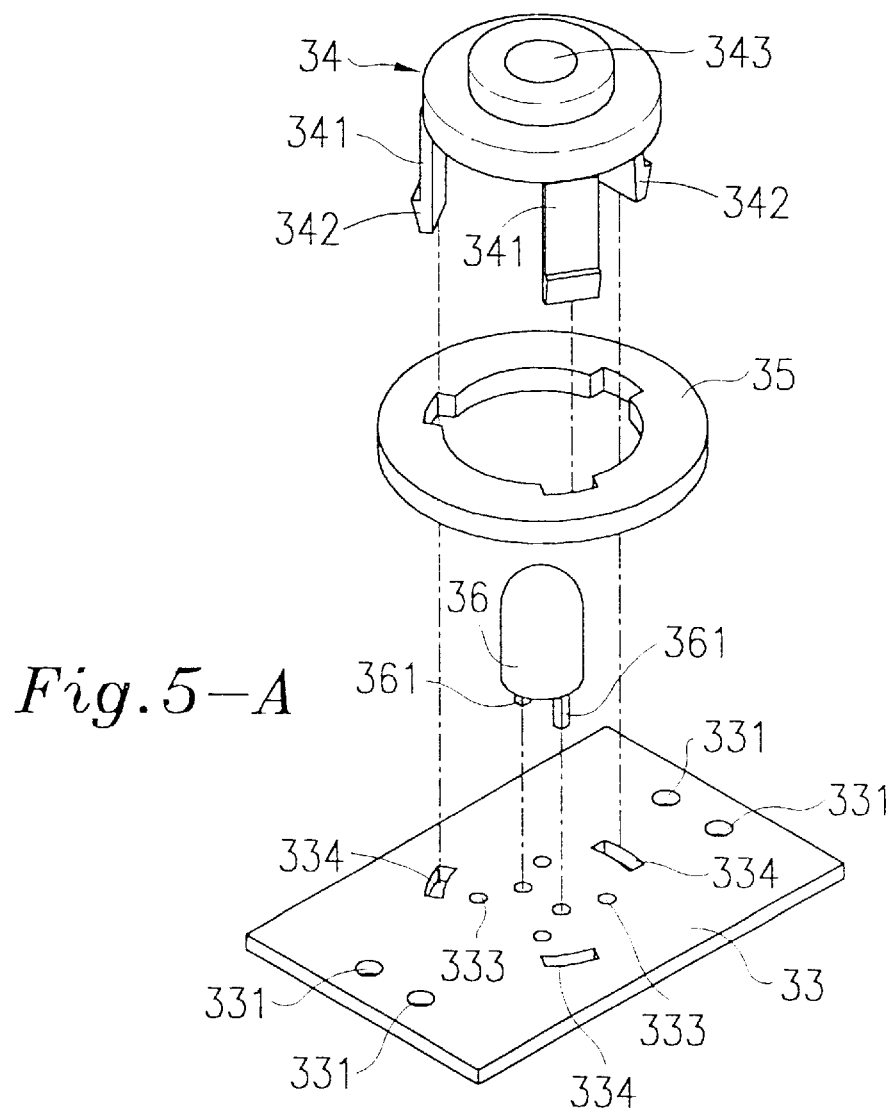
Fig.5-A
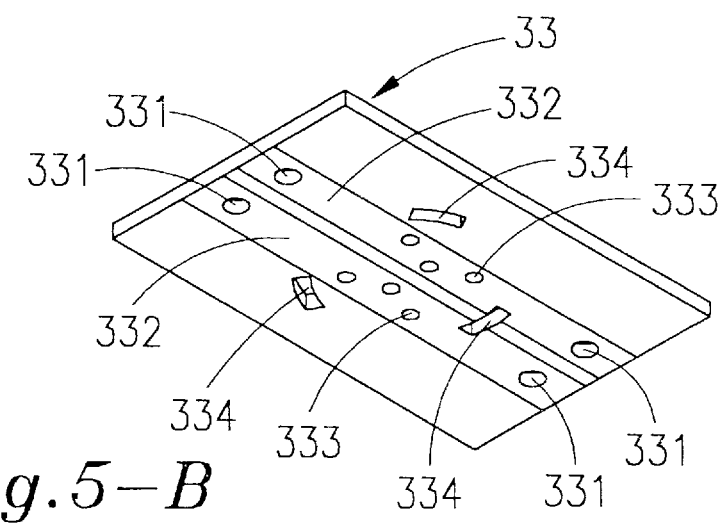
Fig.5-B

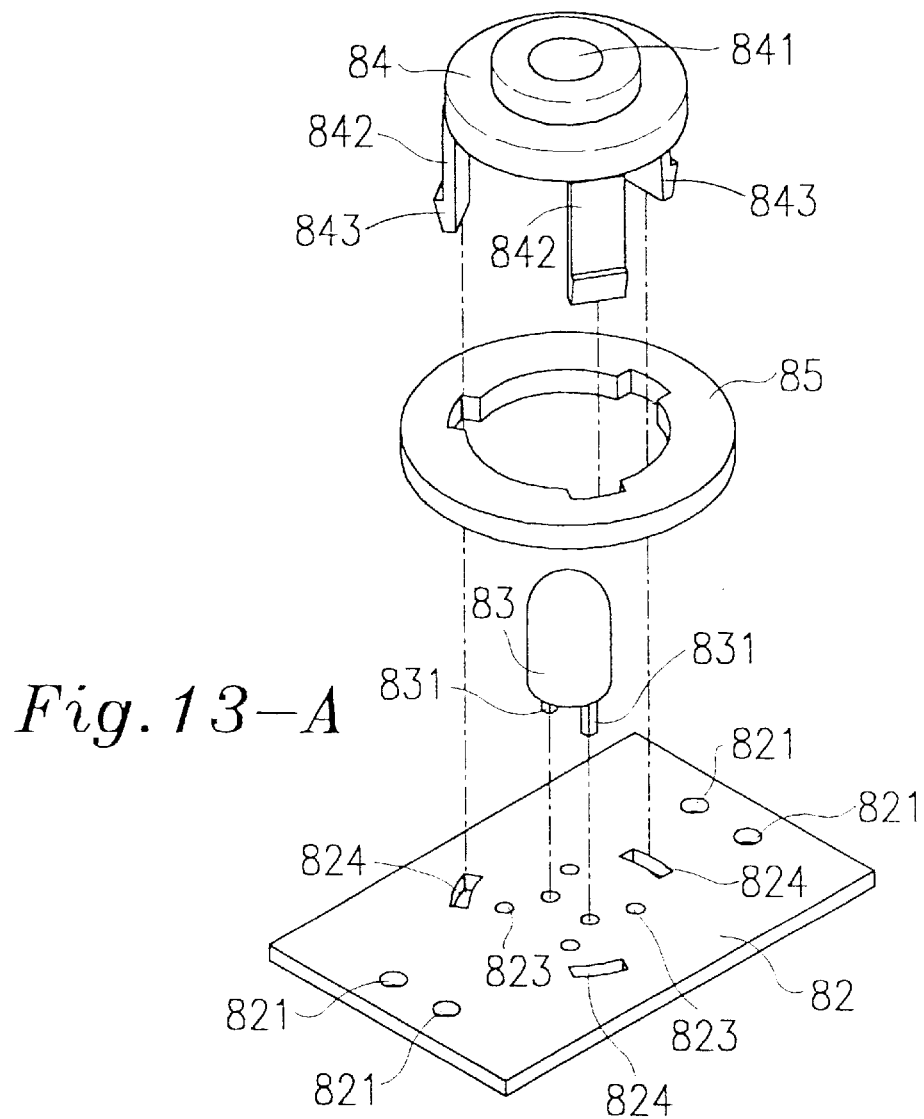
Fig. 13-A
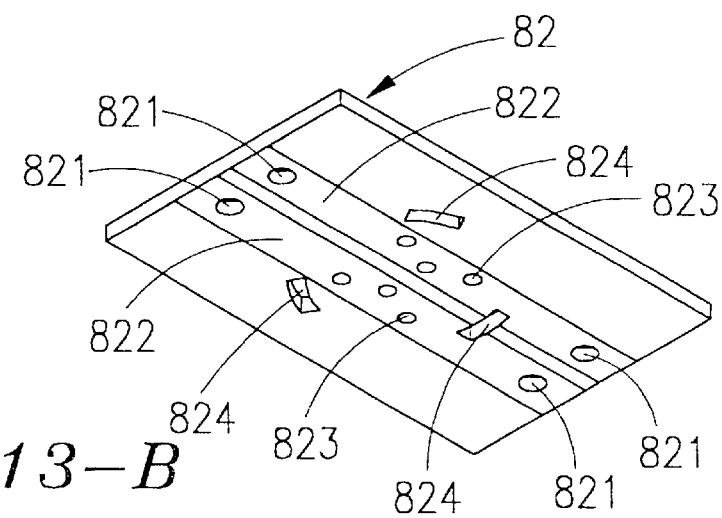
Fig. 13-B

LIGHT-EMITTING DEVICE FOR COVERING REMOVABLY CONIE ROADBLOCK

FIELD OF THE INVENTION

The present invention relates generally to a roadblock, and more particularly to a light-emitting device for use in covering a conic roadblock in such a way that the light-emmiting device can be removed from the conic roadblock which is not in use.

BACKGROUND OF THE INVENTION

As shown in FIG. 1, a conic roadblock 10 of the prior art is provided in the outer surface with a coating of fluorescence capable of producing light while it is being acted upon by radiant energy. The prior art conic roadblock 10 is defective in design in that its warning effect is easily undermined by a poor visibility at night or in an inclement weather.

SUMMARY OF THE INVENTION

The primary objective of the present invention is to provide a light-emitting device which is designed for use along with a conic roadblock.

In keeping with the principle of the present invention, the foregoing objective of the present invention is attained by the light-emitting device comprising a conic body of a fabric material, a plurality of light-emitting elements, a battery bag, and a battery box. The conic body is formed of two fabric layers and is removably fitted over a conic roadblock. The light-emitting elements are sandwiched between the two fabric layers of the conic body and are connected with a power core line of the battery box. The battery bag is fastened with the conic body for containing the battery box.

The conic body is provided with a poll ring to facilitate the removing of the light-emitting device of the present invention from the conic roadblock which is no longer in use.

The conic body of the light-emitting device of the present invention is made of a soft material, such as a waterproof canvas, or polyvinyl chloride (PVC). The light-emitting device of the present invention can be thus folded to facilitate the storage of the device while not in use.

The conic body of the light-emitting device of the present invention is provided with a zipper extending from the base to the vertex of the conic body. The conic body can be therefore spread out by opening the zipper.

The features, the functions, and the advantages of the present invention will be more readily understood upon a thoughtful deliberation of the following detailed description of the present invention with reference to the accompanying drawings.

BRIEF DESCRIPTION OF THE DRAWINGS

FIG. 1 is a schematic view of a roadblock of the prior art.

FIG. 1A is a schematic view of a plurality of the prior art roadblocks which are stacked together.

FIG. 5A is an exploded view of the warning unit of the present invention.

FIG. 5B is a schematic view of a circuit board of the present invention.

FIG. 13A is an exploded view of the warning unit of the second preferred embodiment of the present invention.

FIG. 13B is a schematic view of the rear side of a circuit board of the second preferred embodiment of the present invention.

DETAILED DESCRIPTION OF THE INVENTION

Figure 2:
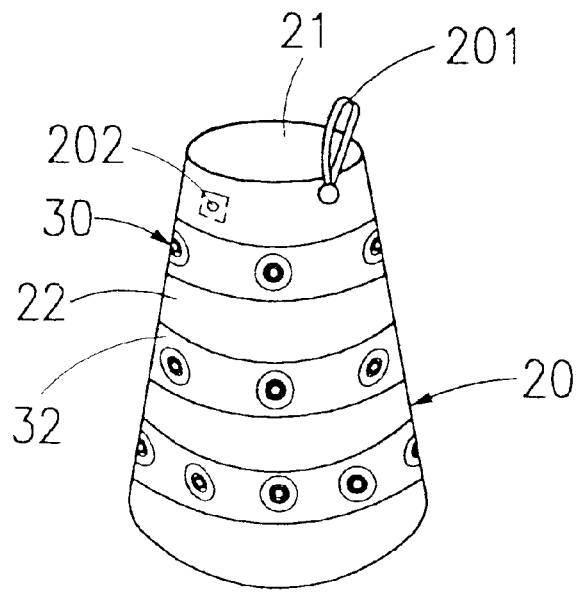
FIG. 2 is a perspective view of the present invention.
Figure 3:
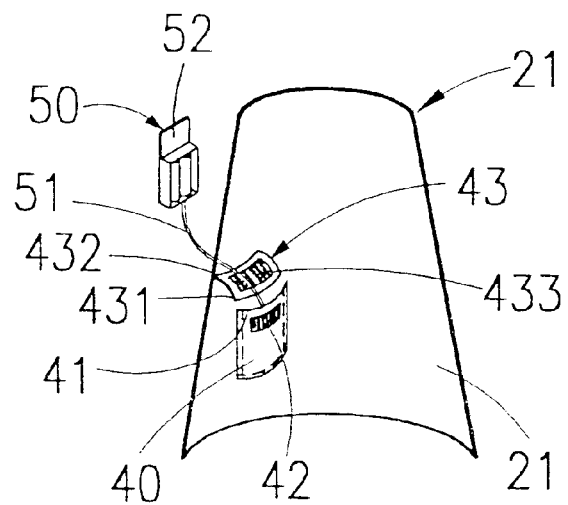
FIG. 3 shows a sectional view of the present invention.
Figure 4:
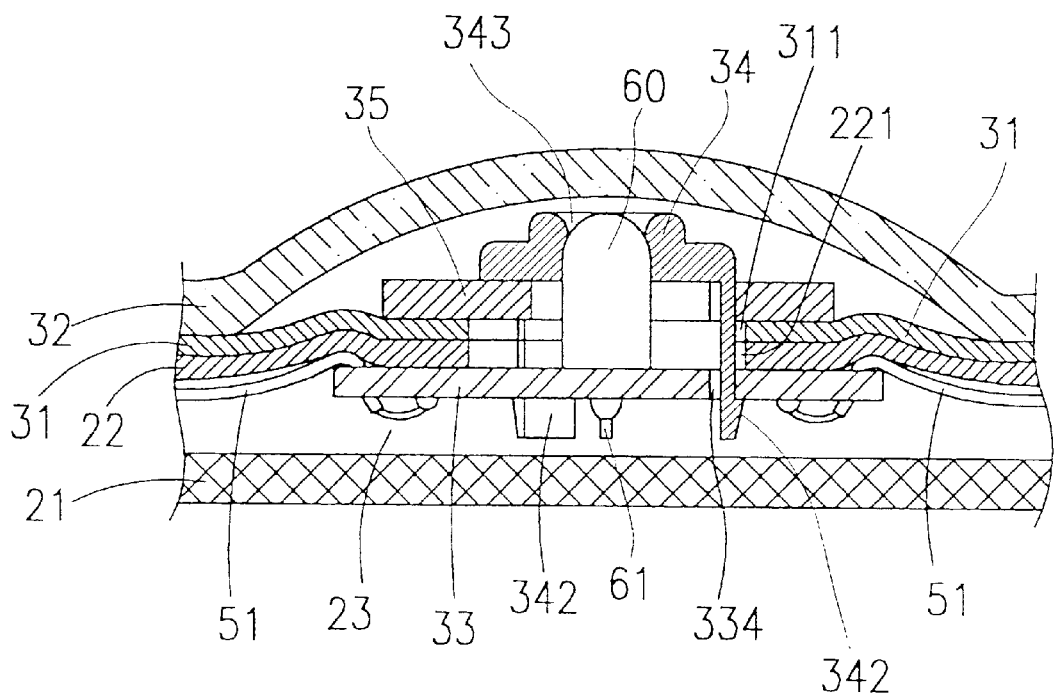
FIG. 4 is a sectional view of a warning unit of the present invention.

As shown in FIGS. 2–4, a light-emitting device of the present invention comprises a hollow conic body 20 of a fabric material, and a plurality of warning units 30 fastened to the conic body 20. The conic body 20 is formed of an inner fabric layer 21 and an outer fabric layer 22, as shown in FIG. 4. The inner layer 21 and the outer layer 22 are made of PVC. The inner layer 21 and the outer layer 22 are joined together such that the fringes of the outer layer 22 are attached to the fringes of the inner layer 21, thereby resulting in formation of a space 23 between the inner layer 21 and the outer layer 22. The outer layer 22 is provided with a plurality of through holes 221 which are arranged at an interval. The conic body 20 is provided in proximity of vertex with a pull ring 201, as shown in FIG. 2. The space 23 is used to dispose a press switch 202 which has a key projection forward the outer layer 22.

Referring to FIG. 3, the inner layer 21 is provided with a battery bag 40 and a battery box 50. The battery bag 40 has an opening 41, a magic tape 42, and an outer cover 43. The outer cover 43 has a root portion 431 which is fastened with the inner layer 21. The outer cover 43 has a free end 432, which covers the opening 41 of the battery bag 40. The free end 432 is provided with a magic tape 433. The outer cover 43 is joined securely with the battery bag 40 by the magic tape 433 of the outer cover 43 and the magic tape 42. The magic tapes 42 and 433 are also known as Velcro tapes which can be pressed together or pulled apart for easy fastening and unfastening. The battery box 50 has a power core line 51 and a poll grip 52. The power core line 51 is connected to the press switch 202 and the warning units 30. The battery box 50 serves to provide the warning units 30. The battery box 50 serves to provide the warning units 30 with power in conjunction with the press switch 202. The pull grip 52 is located at the top of the battery box 50 out of the battery bag 40.

Referring to FIGS. 4 and 5, the warning units 30 are disposed in the space 23 such that the warning units 30 are corresponding in location to the through holes 221 of the outer layer 22, and that the warning units 30 are connected with the power core line 51. The warning units 30 are formed of a light reflecting layer 31, a waterproof layer 32 pervious to light, a circuit board 33, a protective jacket 34, a padded plated 35, and a light-emitting diode 36. The light reflection layer 31 is attached to the outer layer 22 and provided with a plurality of through holes 311 corresponding in location to the through holes 221 of the outer layer 22. The waterproof layer 32 is attached to the light reflecting layer 31 such that the fringe of the waterproof layer 32 is adhered to the edges of the through holes 311 of the light reflecting layer 31. The circuit board 33 is disposed in the space 23 and is provided with a plurality of wiring holes 331 for putting therethrough the power core line 51. Located between the opposite wiring holes 331 is a conductive area 332 for conducting the wiring holes 331. The circuit board 33 is further provided with a plurality of soldering holes 333 for soldering the pins 361 of the light-emitting diode 36. The soldering holes 333 are provided in the periphery with a plurality of retaining holes 334 for retaining the wedge-shaped ends 342 of the clamps 341 of the protective jacket 34.

Referring to FIGS. 4 and 5A, the protective jacket 34 is provided with at least one padded plate 35. The protective jacket 34 is provided in the top with a center through hole 343, and in the bottom with a plurality of clamps 341, with each having a wedge-shaped end 342, which is retained in the retaining hole 334 of the circuit board 33 via the through hole 311 of the light reflecting layer 31 and the through hole 211 of the outer layer 22. As a result, the outer layer 22 and the light reflecting layer 31 are securely retained by the circuit board 33 and the padded plate 35. The light-emitting diode 36 is inserted into the center through hole 343 of the protective jacket 34 and is provided with two pins 361 which are fastened in the soldering holes 333 of the circuit board 33 by soldering. The soldering holes 333 are located in the conductive area 332 of the circuit board 33. The power is transmitted from the power core line 51 to the light-emitting diode 36 via the conductive area 332 of the circuit board 33.

Figure 6:
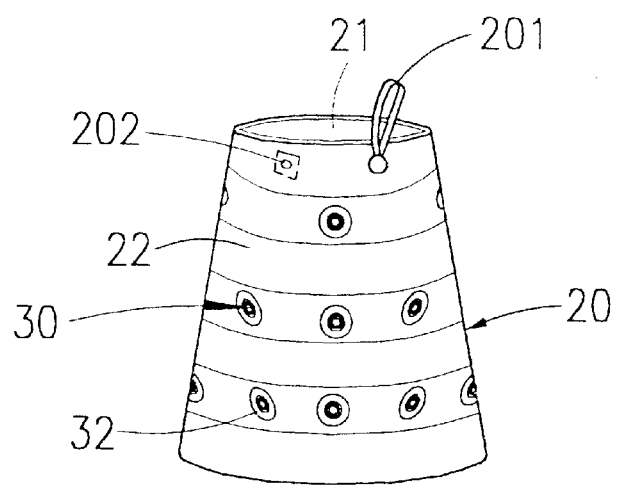
FIG. 6 is a schematic view of a flattened device of the present invention.
Figure 7:
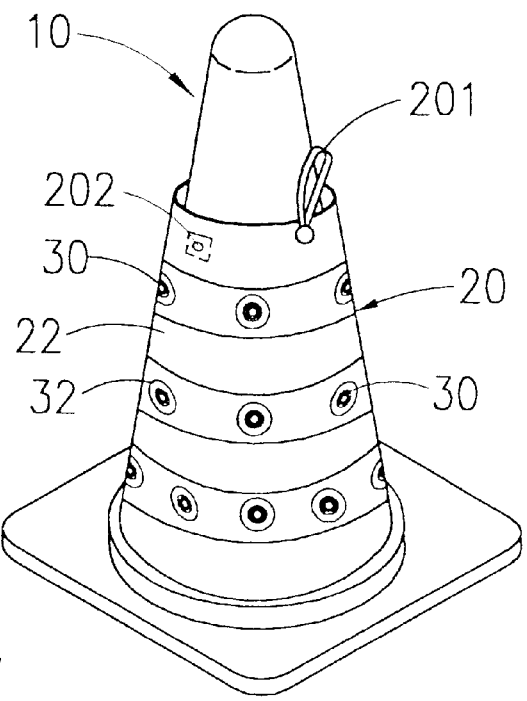
FIG. 7 is a schematic view of the present invention being fitted over a conic roadblock.
Figure 8:
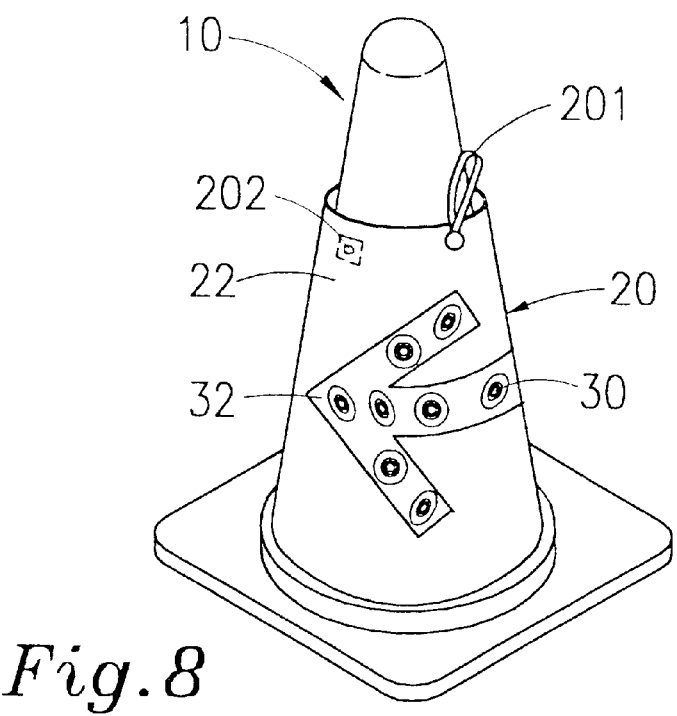
FIG. 8 is another schematic view of the present invention being fitted over a conic roadblock.

Referring to FIGS. 6, 7 and 8, the present invention is designed for use along with the conventional conic roadblock 10. In operation, as soon as the press switch 202 is pressed, the power is transmitted from the battery box 50 to the circuit board 33 via the power core line 51. The power is then made available to the light-emitting diode 36 via the conductive area 332 of the circuit board 33. The roadblock 10 is thus vividly visible, thanks to the light emitted by the light-emitting diode 36. When the roadblock 10 is no longer in use, the roadblock 10 can be easily stripped of the present invention by lifting the present invention with finger holding the pull ring 201. In light of the present invention being made of PVC, the present invention can be easily folded to facilitate the storage of the present invention.

Figure 9:
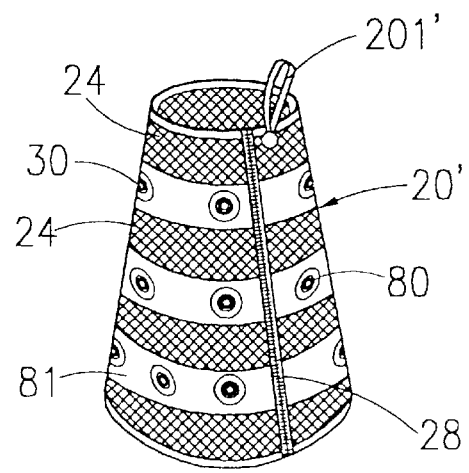
FIG. 9 is a perspective view of a second preferred embodiment of the present invention.
Figure 10:
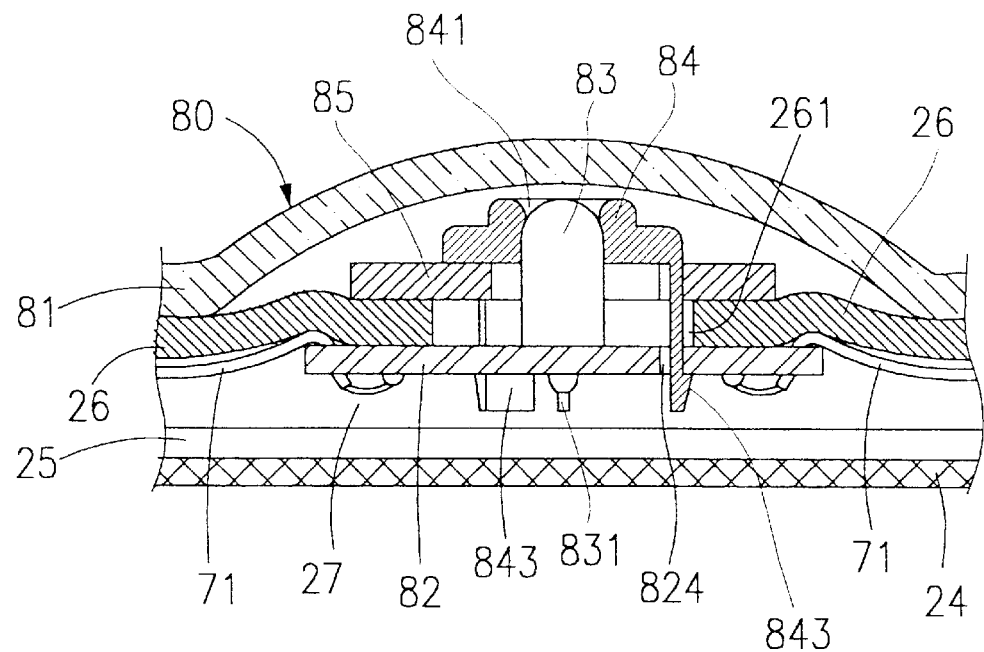
FIG. 10 is a sectional schematic view of a warning unit of the second preferred embodiment of the present invention.
Figure 11:
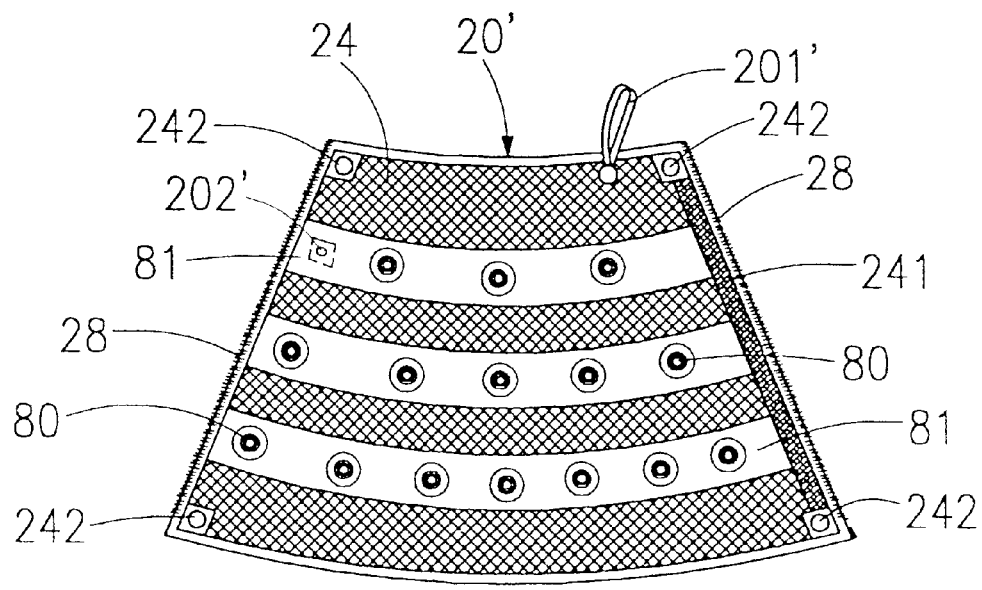
FIG. 11 is a front view of the second preferred embodiment of the present invention being spread out.
Figure 12:
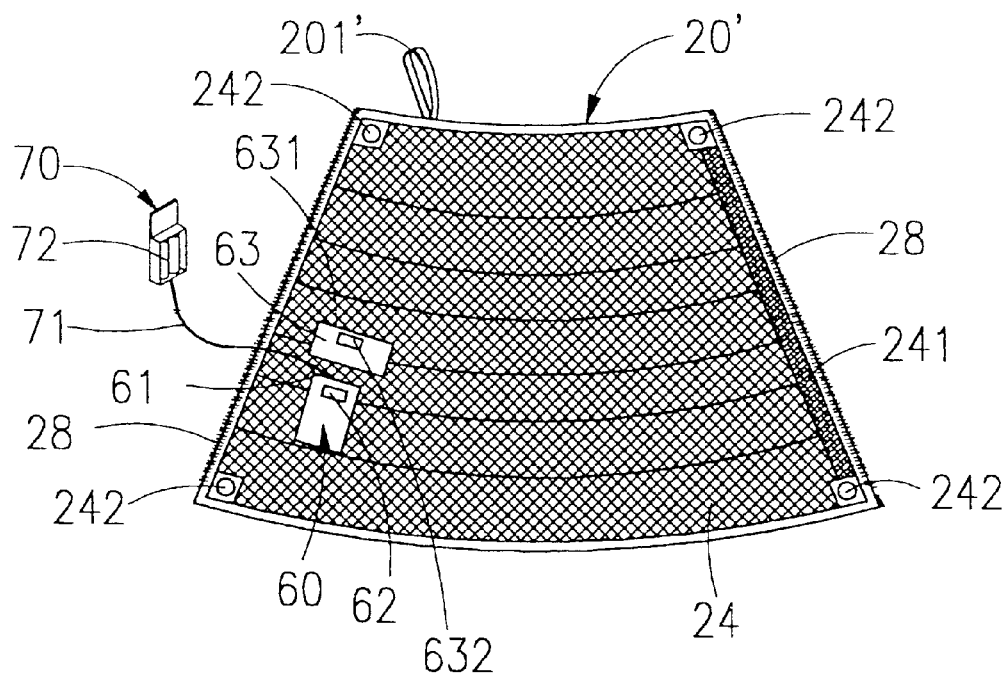
FIG. 12 is a rear view of the second preferred embodiment of the present invention being spread out.
Figure 14:
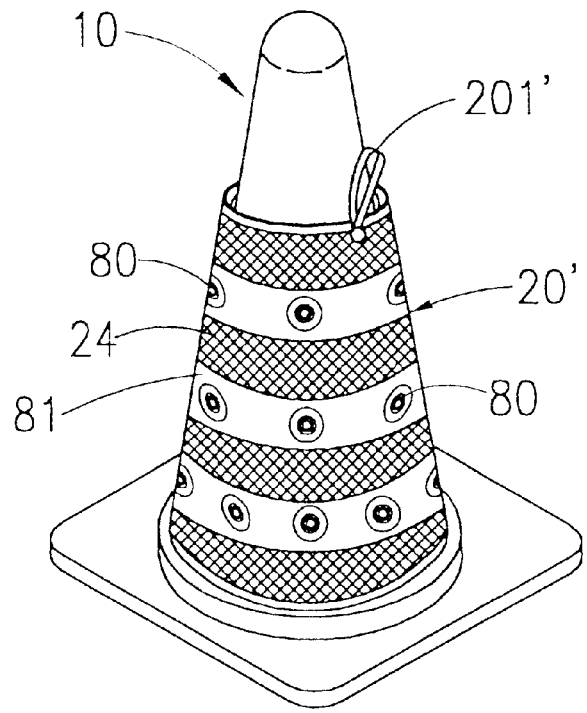
FIG. 14 is a schematic view of the second preferred embodiment of the present invention being fitted over a conic roadblock.
Figure 15:
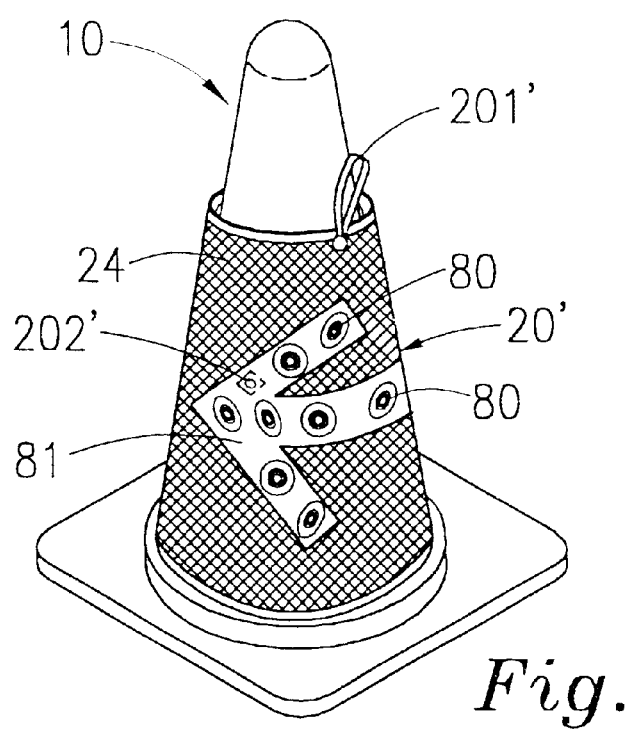
FIG. 15 is another schematic view of the second preferred embodiment of the present invention being fitted over a conic roadblock.

Referring to FIGS. 9–12, the second preferred embodiment of the present invention comprise a hollow conic body 20' which is provided with a meshed layer 24, a plurality of outer fabric layers 25, and a plurality of light reflecting layers 26. The outer fabric layer 25 is adhered to the meshed layer 24, as shown in FIG. 10. The light reflecting layers 26 are attached to the outer fabric layers 25 such that the fringes of the light reflecting layers 26 are adhered to the fringes of the outer fabric layers 25, thereby resulting in formation of a receiving space 27 between the outer fabric layers 25 and the light reflecting layers 26. The light reflecting layers 26 are provided with a plurality of through holes 261 which are arranged at an interval. The conic body 20' is provided with a zipper 28 extending in the direction from the base to the vertex of the conic body 20', as shown in FIG. 9. As the conic body 20' is unzipped, the conic body 20' can be spread out to have a sectoral shape, as shown in FIGS. 11 and 12. The conic body 20' is provided in proximity of the vertex thereof with an upright pull ring 201'. The roadblock 10 is stripped of the conic body 20' with finger holding the pull ring 201'. The receiving space 27 serves to house a press switch 202' which has a key projecting toward the light reflecting layers 26, as shown in FIG. 11.

Referring to FIG. 12 the battery bag 60 and the battery box 70 are disposed on the back side of the meshed layer 24 of the conic body 20'. The battery bag 60 has an opening 61, a magic tape 62, and an outer cover 63 which is provided at the free end thereof with a magic tape 632. The opening 61 is covered by the outer cover 63 such that the magic tape 62 is fastened with the magic tape 632 of the outer cover 63. The battery box 70 is kept in the battery bag 60 and is provided with a power core line 71 and at least one dry battery. The power core line 71 is disposed in the receiving space 27 and is serially connected with the warning units 80. The illuminating of the warning units 80 is regulated by the press switch 202'.

Referring to FIGS. 10, 13A, and 13B, the warning units 80 are housed in the receiving space 27 such that they are corresponding in location to the through holes 261 of the light reflecting layer 26. The warning units 80 are formed of a waterproof layer 81 pervious to light, a circuit board 82, a light-emitting diode (LED) 83, a protective jacket, and a padded plate 85. The waterproof layer 81 is attached to the light reflecting layer 26 such that the fringe of the waterproof layer 81 is adhered to the fringes of the through holes 261 of the light reflecting layer 26. The circuit board 82 is disposed in the receiving space 27 and is provided in two opposite sides thereof with two wiring holes 821. The circuit board 82 is provided with a conductive area 822 via which the wiring holes 821 are connected. The conductive area 822 is provided with a plurality of soldering holes 823 for fixing the pins 831 of the LED 83, and a plurality of retaining holes 824 circumventing the soldering holes 823. The protective jacket 84 is provided with a center through hole 841 and a plurality of clamps 842 which are provided with a wedge-shaped end 843. The light reflecting layer 23 is held between the circuit board 82 and the padded plate 85. The wedge-shaped end 843 is retained in the retaining hole 824 via the through hole 261 of the light reflecting layer 23. The protective jacket 84 is provided with at least one padded plate 85. The light-emitting diode 83 has two pins 831. The top of the light-emitting diode 83 is inserted into the center through hole 841 of the protective jacket 84 such that the pins 831 are fixed in the soldering holes 823 of the circuit board 82. As a result, the pins 831 of the light-emitting diode 83 are connected with the conductive area 822 of the circuit board 82.

Referring to FIGS. 11 and 12, the meshed layers 24 of the conic body 20' are provided with a magic tape 241 and a plurality of round holes 242. In the event that the zipper 28 is out of order, the magic tapes 241 of the meshed layers 24 may be used. The conic body 20' of the second preferred embodiment of the present invention can be also folded to facilitate the storage of the conic body 20'.

Referring to FIGS. 7, 8, 14, and 15, the light reflecting layer 31 may be designed in accordance with the circumstance of the road construction.

The power source of the warning units of the present invention may be solar energy, car battery, or and alternating current source. The warning units may be provided with a photosensor by which the warning units are automatically activated in case of a poor visibility or inclement weather.

What is claimed is:

1. A roadblock light emitting device for detachably wearing on a conic roadblock, wherein said roadblock light emitting device comprises:

a hollow conic body comprising an inner fabric layer and an outer fabric layer joined together to define a receiving space between said inner fabric layer and said outer fabric layer, wherein said outer fabric layer has a plurality of through holes spacedly provided thereon, wherein said hollow conic body has a top end having a diameter slightly larger than a diameter of an upper portion of said conic roadblock and a bottom end having a diameter slightly larger than a diameter of lower portion of said conic roadblock so that said hollow conic body is adapted to wear on said conic roadblock and cover at least a middle portion of an exterior surface of said conic roadblock;

a plurality of warning units, which are disposed in said receiving space, being mounted on said outer fabric layer and positioned at said through holes of said outer fabric layer respectively, wherein each of said warning units comprises a light-emitting diode disposed through said respective through hole for emitting light to outside of said outer layer of said conic body, so that said light-emitting diodes are distributed around said outer fabric layer of said hollow conic body;

a power switch provided on said outer fabric layer of said hollow conic body, wherein said power switch is electrically connected with said warning units; and a battery bag which is mounted on said inner fabric layer and contains a battery box that receives at least a battery and electrically connects with said power switch and said warning units so as to electrical power for said warning units.

2. The roadblock light emitting device, as recited in claim 1, wherein each of said warning units further comprises a light reflecting layer, a water proof layer pervious to light, a circuit board, and a protective jacket, wherein said light reflecting layer is disposed on said outer fabric layer and provided with a plurality of light reflecting through holes coaxially overlapped with said through holes on said outer fabric layer, wherein said waterproof layer is attached to said light reflecting layer wherein a fringe of said water proof layer is adhered to edges of said light reflecting through holes of said light reflecting layer, wherein said circuit board is housed in said receiving space and provided in two opposite sides thereof with a pair of wiring holes, and a conductive area located between said two opposite sides, wherein said conductive area is provided with a plurality of soldering holes and a plurality of retaining holes, wherein said protective jacket is provided at top with a center through hole and at a bottom with a plurality of clamps where each of said clamps has a wedge-shaped end, wherein said respective light emitting diode which is provided with two pins is held by said protective jacket in such a manner that a top of said light emitting diode is inserted into said center through hole of said protective jacket and said two pins are fastened to said two soldering holes of said circuit board by soldering.

3. The roadblock light emitting device, as recited in claim 1, wherein said hollow conic body is provided in proximity of vertex with a pull ring.

4. The roadblock light emitting device, as recited in claim 2, wherein said hollow conic body is provided in proximity of vertex with a pull ring.

5. The roadblock light emitting device, as recited in claim 1, wherein said battery bag has an opening, a first fastener, and an outer cover having root portion fastened with said inner layer, wherein said outer cover which has a free end covers said opening of said battery bag, wherein said free end is provided with a second fastener, wherein said outer cover is joined securely with said battery bag by connecting said second fastener with said first fastener, wherein said battery box has a pull grip and a power core line connected to said power switch and said warning units, wherein said battery box serves to said warning units with electrical power and said pull grip is located at said top of said battery box out of said battery bag.

6. The roadblock light emitting device, as recited in claim 2, wherein said battery bag has an opening, a first fastener, and an outer cover having root portion fastened with said inner layer, wherein said outer cover which has a free end covers said opening of said battery bag, wherein said free end is provided with a second fastener, wherein said outer cover is joined securely with said battery bag by connecting said second fastener with said first fastener, wherein said battery box has a pull grip and a power core line connected to said power switch and said warning units, wherein said battery box serves to said warning units with electrical power and said pull grip is located at said top of said battery box out of said battery bag.

7. The roadblock light emitting device, as recited in claim 3, wherein said battery bag has an opening, a first fastener, and an outer cover having root portion fastened with said inner layer, wherein said outer cover which has a free end covers said opening of said battery bag, wherein said free end is provided with a second fastener, wherein said outer cover is joined securely with said battery bag by connecting said second fastener with said first fastener, wherein said battery box has a pull grip and a power core line connected to said power switch and said warning units, wherein said battery box serves to said warning units with electrical power and said pull grip is located at said top of said battery box out of said battery bag.

8. The roadblock light emitting device, as recited in claim 4, wherein said battery bag has an opening, a first fastener, and an outer cover having root portion fastened with said inner layer, wherein said outer cover which has a free end covers said opening of said battery bag, wherein said free end is provided with a second fastener, wherein said outer cover is joined securely with said battery bag by connecting said second fastener with said first fastener, wherein said battery box has a pull grip and a power core line connected to said power switch and said warning units, wherein said battery box serves to said warning units with electrical power and said pull grip is located at said top of said battery box out of said battery bag.

9. A roadblock light emitting device for detachably wearing on a conic roadblock, wherein said roadblock light emitting device comprises:

a hollow conic body comprising a meshed layer, an outer fabric layer, and a plurality of light reflecting layers, wherein said outer fabric layer is disposed on said meshed layer and said light reflecting layers are disposed on said outer fabric layer wherein flanges of said light reflecting layers are adhered to fringes of said outer fabric layers, wherein a receiving space is defined between said outer fabric layer and said light reflecting layers, wherein said light reflecting layers have a plurality of through holes spacedly provided thereon, wherein said hollow conic body has a top end having a diameter slightly larger than a diameter of an upper portion of said conic roadblock and a bottom end having a diameter slightly larger than a diameter of lower portion of said conic roadblock so that said hollow conic body is adapted to wear on said conic roadblock and cover at least a middle portion of an exterior surface of said conic roadblock;

a plurality of warning units, which are disposed in said receiving space, being mounted on said light reflecting layers and positioned at said through holes of said light reflecting layers respectively, wherein each of said warning units comprises a light-emitting diode disposed through said respective through hole for emitting light to outside of said light reflecting layers of said conic body, so that said light-emitting diodes are distributed around said light reflecting layers of said hollow conic body;

a power switch provided on said light reflecting layers of said hollow conic body, wherein said power switch is electrically connected with said warning units; and a battery bag which is mounted on said meshed layer and contains a battery box that receives at least a battery and electrically connects with said power switch and said warning units so as to electrical power for said warning units.

10. Said roadblock light emitting device, as recited in claim 9, wherein each of said warning units comprises a waterproof layer pervious to light, a circuit board, and a protective jacket, wherein said waterproof layer is attached to said light reflecting layer where a fringe of said waterproof layer is adhered to fringes of said through holes of said light reflecting layer, wherein said circuit board is disposed in said receiving space and is provided in two opposite sides thereof with two wiring holes, wherein said protective jacket is provided with at least one padded plate and said light-emitting diode has two pins, wherein said circuit board is provided with a conductive area via which said wiring holes are connected, wherein said conductive area is provided with a plurality of soldering holes, wherein said circuit board further has a plurality of retaining holes circumventing said soldering holes, wherein said protective jacket is provided with a center through hole and a plurality of clamps which are provided with a wedge-shaped end, wherein said light reflecting layer is held between said circuit board and padded plate and said wedge-shaped end is retained in said retaining hole via said through hole of said light reflecting layer, wherein a top of said light-emitting diode is inserted into said center through hole of said protective jacket while said pins of said respective light emitting diode are fixed in said soldering holes of said circuit board in order to connect said pins of said light-emitting diode with said conductive area of said circuit board.

11. The roadblock light emitting device, as recited in claim 9, wherein said hollow conic body is provided in proximity of vertex with a pull ring.

12. The roadblock light emitting device, as recited in claim 10, wherein said hollow conic body is provided in proximity of vertex with a pull ring.

13. The roadblock light emitting device, as recited in claim 9, wherein said battery bag has an opening, a first fastener, and an outer cover having root portion fastened with said meshed layer, wherein said outer cover which has a free end covers said opening of said battery bag, wherein said free end is provided with a second fastener, wherein said outer cover is joined securely with said battery bag by connecting said second fastener with said first fastener, wherein said battery box has a pull grip and a power core line connected to said power switch and said warning units, wherein said battery box serves to said warning units with electrical power and said pull grip is located at said top of said battery box out of said battery bag.

14. The roadblock light emitting device, as recited in claim 10, wherein said battery bag has an opening, a first fastener, and an outer cover having root portion fastened with said meshed layer, wherein said outer cover which has a free end covers said opening of said battery bag, wherein said free end is provided with a second fastener, wherein said outer cover is joined securely with said battery bag by connecting said second fastener with said first fastener, wherein said battery box has a pull grip and a power core line connected to said power switch and said warning units, wherein said battery box serves to said warning units with electrical power and said pull grip is located at said top of said battery box out of said battery bag.

15. The roadblock light emitting device, as recited in claim 11, wherein said battery bag has an opening, a first fastener, and an outer cover having root portion fastened with said meshed layer, wherein said outer cover which has a free end covers said opening of said battery bag, wherein said free end is provided with a second fastener, wherein said outer cover is joined securely with said battery bag by connecting said second fastener with said first fastener, wherein said battery box has a pull grip and a power core line connected to said power switch and said warning units, wherein said battery box serves to said warning units with electrical power and said pull grip is located at said top of said battery box out of said battery bag.

16. The roadblock light emitting device, as recited in claim 12, wherein said battery bag has an opening, a first fastener, and an outer cover having root portion fastened with said meshed layer, wherein said outer cover which has a free end covers said opening of said battery bag, wherein said free end is provided with a second fastener, wherein said outer cover is joined securely with said battery bag by connecting said second fastener with said first fastener, wherein said battery box has a pull grip and a power core line connected to said power switch and said warning units, wherein said battery box serves to said warning units with electrical power and said pull grip is located at said top of said battery box out of said battery bag.

17. The roadblock light emitting device, as recited in claim 9, wherein said hollow conic body is provided with a zipper extending in a direction from a base to a vertex thereof.

18. The roadblock light emitting device, as recited in claim 10, wherein said hollow conic body is provided with a zipper extending in a direction from a base to a vertex thereof.

19. The roadblock light emitting device, as recited in claim 13, wherein said hollow conic body is provided with a zipper extending in a direction from a base to a vertex thereof.

20. The roadblock light emitting device, as recited in claim 14, wherein said hollow conic body is provided with a zipper extending in a direction from a base to a vertex thereof.

\* \* \* \* \*